United States Patent [19]

Sikora

[11] Patent Number: 5,092,754
[45] Date of Patent: Mar. 3, 1992

[54] DEVICE FOR VULCANIZING OR CROSS-LINKING A CORD, PARTICULARLY A CABLE PROVIDED WITH A PLASTIC COVERING

[75] Inventor: Harald Sikora, Bremen, Fed. Rep. of Germany

[73] Assignee: Sikora Industrieelectronik GmbH, Bremen, Fed. Rep. of Germany

[21] Appl. No.: 476,266

[22] Filed: Feb. 7, 1990

[30] Foreign Application Priority Data

Mar. 14, 1989 [DE] Fed. Rep. of Germany ....... 3908533

[51] Int. Cl.⁵ ............................................. B29C 35/06
[52] U.S. Cl. .................................... 425/169; 425/173; 425/404; 425/446
[58] Field of Search .................... 425/70, 73, 169, 172, 425/173, 505, 508, 404, 445, 446

[56] References Cited

U.S. PATENT DOCUMENTS

| | | | |
|---|---|---|---|
| 3,346,247 | 10/1967 | Talalay et al. | 264/347 |
| 4,222,980 | 9/1980 | Stauffer et al. | 264/347 |
| 4,229,970 | 10/1980 | Barker et al. | 264/40.2 |
| 4,353,861 | 10/1982 | Caser | 425/445 |
| 4,356,143 | 10/1982 | Hill et al. | 425/445 |
| 4,416,601 | 11/1983 | Hasegawa et.al. | 425/445 |
| 4,708,619 | 11/1987 | Balk | 264/40.2 |

FOREIGN PATENT DOCUMENTS 0099993 6/1983 European Pat. Off. .
2826857 6/1978 Fed. Rep. of Germany .
3109173 3/1981 Fed. Rep. of Germany .

Primary Examiner—Willard E. Hoag
Attorney, Agent, or Firm—Faegre & Benson

[57] ABSTRACT

A device for vulcanizing or cross-linking a cord particularly a cable provided with a plastic covering, the device comprising an elongated pipe housing at the upper end of the housing, the cord being inserted and the upper area thereof being defined as a heating area and the lower area thereof as a cooling area wherien at least the heating area is provided with an inlet and an outlet for a protective gas, and an inspection window fitting positioned laterally at the pipe housing adjacent to the upper end for inspecting or measuring, respectively, the diameter of the cord by means of a suitable optical-electrical measuring device through an inspection window, wherein a separate heating device is associated with the upper area of the heating area of the pipe housing associated with the inspection window fitting, the heating device heating the atmosphere in the upper area permanently to a temperature higher than in the remaining areas of the heating area.

2 Claims, 1 Drawing Sheet

DEVICE FOR VULCANIZING OR CROSS-LINKING A CORD, PARTICULARLY A CABLE PROVIDED WITH A PLASTIC COVERING

The present invention relates to a device for vulcanizing or cross-linking a cord, particularly a cable provided with a plastic covering.

Devices for vulcanizing or cross-linking a cord are known from DE-OS 28 26 857 or EP 0 099 993. As an example, for cables usually the lead is provided with a plastic covering in an extruder, the covering subsequently being inserted into a pipe-like housing wherein the dry cross-linking or the vulcanizing, respectively, is accomplished. The pipe-like housing is divided into a heating and a cooling area. The heating area (cross-linking portion) may be divided in singular subareas which are given a different temperature (temperature profile). The heating area usually is filled with a protective gas, e.g. nitrogen or steam. Furthermore, it is known from EP 0 099 993 to arrange a so-called inspection window fitting laterally at the pipe housing. For this purpose, a transverse pipe is attached in the upper area between the extruder and the cross-linking portion in the so-called telescopic pipe portion by means of a flange. An inspection window made of a suitable glass composition is attached at the free end of the transverse pipe, the inspection window serving as an example for measuring the diameter of the cord by means of an optical measuring device. In this connection, it is further known additionally to arrange an infrared source in the pipe housing, the source providing a sufficient background illumination to enable an accurate test of the diameter by means of a line of diodes or the like.

During the vulcanizing or cross-linking process crack products are set free which will move within the atmosphere of the interior of the housing and travel also into the upper area of the heating area because of the temperature gradient. The upper area of the heating area formed as a telescopic pipe normally is not heat-insulated, whereas the adjacent pipe is covered by a suitable heat insulation. As the telescopic pipe cools the protective gas particularly strongly because of lacking heating and lacking heat insulation, a continuous heat exchange will happen because the cooled protective gas will sink, whereas the hotter protective gas out of the cross-linking area including the crack products solved therein will raise to the upper area of the unit, i.e. the telescopic pipe. Therefore, the crack products will tend to travel particularly into the upper area causing a contamination of the inspection window and also of the infrared source within a short period of time. The contamination of the infrared source will reduce the brightness thereof. The contamination of the inspection window will impair the precise measuring of the diameter. When steam is used, furthermore there is the danger that fog will form in the upper area of the heating area, the fog preventing a measuring of the diameter.

Furthermore is known from EP 0 099 993 which was frequently quoted to feed nitrogen into the pipe retaining the inspection window, the nitrogen having a higher pressure than the pressure in the heating area. The nitrogen gas is intended to prevent that contaminated parts will travel to the inspection window. In the known device,the temperature of the nitrogen gas has to be lower than the temperature in the heating area. However, it has been detected that with this device a contamination of the inspection window cannot be completely prevented either. This means has no influence whatever on the contamination of the infrared source.

It is the object of the present invention to provide a device for vulcanizing or cross-linking a cord, particularly a cable provided with a plastic covering the device preventing that particles contaminating the inspection window fitting will not travel into the upper area of the pipe housing wherein in the upper area thereof also a formation of fog will be prevented when using steam as a protective gas.

In the device according to the invention, a separate heating device is provided in the upper area of the cross-linking portion, the heating device providing that the atmosphere is permanently heated to a temperature which is higher than in the remaining areas of the cross-linking portion. Surprisingly, it has been detected that in this way it is prevented that contaminating particles will travel into the upper area of the heating area to a considerably extent. Therefore, the contamination of the inspection window fitting is greatly reduced. As the measuring area in the upper part of the telescopic pipe is relatively narrow, the heated ara has only to be relatively small such that already a relatively small heating power is sufficient to provide for a sufficient temperature. A heating power of one kilowatt or less may be absolutely sufficient.

As mentioned before, it is known to arrange an infrared source at the side opposite to the inspection window in the pipe housing in order to create an even sufficient background illumination for measuring purposes. According to an embodiment of the invention, the heating device may be formed by an infrared source, particularly by a glowing strand extending partly along the circumference of the pipe. For carrying out the measurement, only some watt will be sufficient to create a sufficient background illumination. In case the glowing strand is installed for a high power, e.g. 1 kilowatt, it may be at the same time heat the protective gas in the area of measurement to the desired temperature.

It may contribute to the prevention of fog formation or a contamination of the inspection window fitting when also the protective gas fed into the inspection window fitting is heated to such an extent that upon entering it will raise to and remain in the upper area of the heating area for as long as possible.

By means of the device according to the invention, it is possible to keep an inspection window clean over a longer period of time such that a precise measuring is guaranteed. The same is true for the infrared source which will not incur any contamination either.

Subsequently, the invention is in more details explained referring to the drawings.

Figure 1:
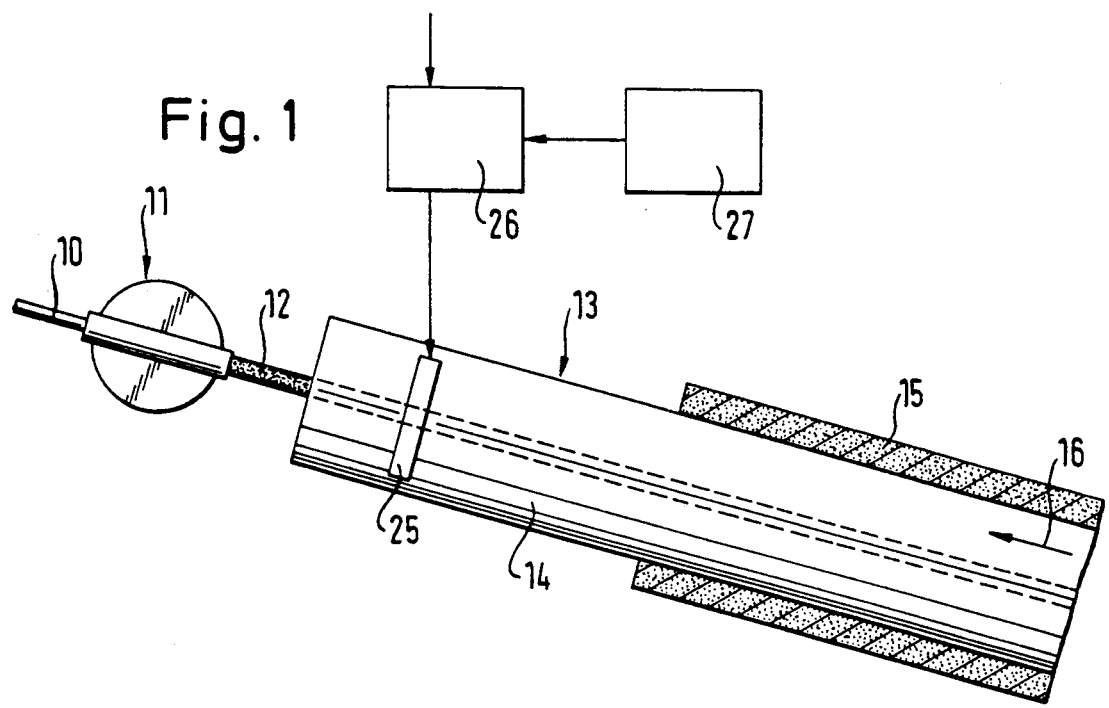
FIG. 1 very diagrammatically shows a device according to the invention.

An electrical lead 10 is covered with a plastic covering in an extruder 11. The covered cord 12 is fed into a pipe housing 13, wherein a cross-linking is attained in the known manner. As is obvious, the section 14 of the pipe housing adjacent to the extruder 11 is not insulated whereas the adjacent section 15 is provided with an insulation. The shown sections form parts of a heating area which is heated by a suitable heating device (not shown). Protective gas, e.g. nitrogen or steam is fed via a suitable connection (not shown) and will stream in direction of the arrow 16.

Figure 2:
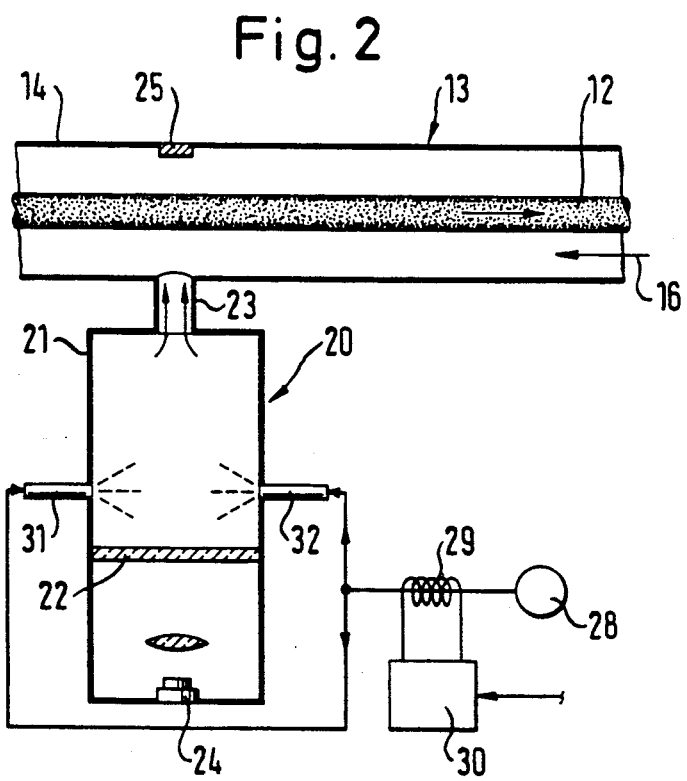
FIG. 2 also depicts diagrammatically an inspection window in the device according to the invention.

It is obvious from FIG. 2 that an inspection window fitting 20 is laterally attached to the section 14. The fitting comprises a housing 21 containing an inspection window 22. The housing 21 is connected with the pipe section 14 by a connecting pipe stud 23. At the side of the housing 21 facing away from the pipe stud, an optical measuring device 24 is positioned by means of which the diameter of the cord 12 is measured. Opposite to the pipe stud 23, a heating strand 25 is arranged in the pipe section 15 which extends along a part of the circumference of the pipe section 14 as can be seen in FIG. 1. The heating strand is electrically heated by a heating source 26 which is controlled by means of a control device 27. The control device 27 enables that a current of a minimal power is fed through the heating strand 25. The heating strand serves for heating the atmosphere in the area of the strand which means the measuring area to a temperature higher than the temperature in the remaining heating area. Thereby, a heat gradient is created from top to bottom which will prevent that contaminating particles particularly caused by crack products will travel into the measuring area and contaminate the inspection window fitting 20 or the inspection window 22, respectively. A contamination of the heating strand 25 serving simultaneously for a sufficient background illumination for the measuring device 24 is prevented also. In a steam atmosphere the formation of fog in the area of measurement s prevented by this means.

The housing 21 comprises two connections 26, 27 for a protective gas, e.g. nitrogen or steam which is fed under pressure from a suitable source 28 into the interior of the housing 21. A heating spiral 29 encompasses a lead portion to the connections 26, 27 and is controlled by an electrical heating device. Thereby, the protective gas is heated to a temperature which in any case is high enough to prevent that the protective gas will cool the atmosphere in the measuring area of that the protective gas will contribute to the above mentioned effect of heating the area of measurement when leaving the housing 21 and entering the pipe section 14.

I claim:

1. A device for vulcanizing or cross-linking a cord including a cable provided with a plastic covering, the device comprising an elongated pipe housing at the upper end of the housing, the cord being insertable and an upper portion of the housing defining a heating area and a lower portion of the housing defining a cooling area wherein at least the heating area is provided with an inlet for a protective gas, and an inspection window fitting positioned laterally at the pipe housing adjacent to an upper end for inspecting or measuring, respectively, the diameter of the cord by means of a suitable optical-electrical measuring device through said inspection window, the vulcanizing device having a heating device separate from a source of heat that heats the heating area generally, the heating device being defined by an infrared source, including a glowing strand positioned in the pipe housing at the side opposite to the inspection window, the heating device being associated with an upper portion of the heating area of the pipe housing associated with the inspection window fitting, the heating device being sufficient to heat gas in the upper portion of the heating area permanently to a temperature higher than in remaining portions of the heating area such that the contamination of the inspection window is reduced.

2. Device as claimed in claim 1, wherein the inspection window fitting comprises a connection for a protective gas, constructed such that high temperature protective gas fed into the inspection window fitting will heat the upper area in the pipe housing and the atmosphere to a temperature higher than in the remaining areas of the heating area.

* * * * *